United States Patent Office 2,731,460
Patented Jan. 17, 1956

2,731,460
PROCESS FOR PRODUCING AMMONIA DERIVATIVES OF POLYNITROALCOHOLS

Friedrich Rudolf Schenck and Gustav Allan Wetterholm, Gyttorp, Sweden, assignors to Nitroglycerin Aktiebolaget, Gyttorp, Sweden No Drawing. Application July 3, 1952, Serial No. 297,166

Claims priority, application Sweden July 10, 1951

12 Claims. (Cl. 260—239)

The normal way of producing an amine is alkylating ammonia in the gas phase or in alcoholic solution by means of an alkylhalogenide or alkylsulfate, thereby obtaining a mixture of primary, secondary and tertiary amines and, may be, also quarternary ammonium salts. Consequently, for carrying out this process a special alkylating agent is required, and it has hitherto not been possible to produce an amine by direct conversion in solution between an alcohol and ammonia, with removal of water, according to the formula $$RCH_2OH + NH_3 \rightarrow RCH_2NH_2 + H_2O$$

It has now been found that it is possible to react polynitroalcohols directly with ammonia or amine compounds with formation of primary or secondary amines or amides. The following reaction formulas may serve as examples of the manner in which the reaction takes place:

$$R_1(NO_2)_2C.CH_2OH + NH_3$$
$$= R_1(NO_2)_2C.CH_2.NH_2 + H_2O$$

$$R_1(NO_2)_2C.CH_2OH + R_1(NO_2)_2CCH_2NH_2$$
$$= (R_1(NO_2)_2CCH_2)_2NH + H_2O$$

In these formula $R_1$ may be H, K, $NO_2$ or any other substituent.

The converson, which is carried out in solution, normally appears to cease when a secondary amine has been formed.

Other examples of the reaction are the following:

$$(NO_2)_2C(CH_2OH)_2 + NH_3 = (NO_2)_2C \begin{array}{c} CH_2 \\ \diagup \\ \diagdown \\ CH_2 \end{array} NH + 2H_2O$$

and $$2(NO_2)_2C(CH_2OH)_2 + NH_3 =$$

$$(NO_2)_2 = C \begin{array}{c} CH_2-NH-CH_2 \\ \diagup \quad \diagdown \\ \\ CH_2OH \quad CH_2OH \end{array} C:(NO_2)_2 + 2H_2O$$

The reaction may also be applied in case of ammonia derivatives. Thus, for example, urea reacts, at least partially, with trinitroethanol in the following manner:

$$2(NO_2)_3CCH_2OH + NH_2CONH_2$$
$$= /(NO_2)_3CCH_2NH/_2CO + 2H_2O$$

With hydrazine the reaction is as follows:

$$2R_1(NO_2)_2CCH_2OH + NH_2NH_2$$
$$= /R_1(NO_2)_2CCH_2NH/_2 + 2H_2O$$

Example 1

2 mol. trinitroethanol, or the corresponding, equivalent quantities of nitroform and formaldehyde, are reacted with 1 mol. ammonia at 20° C. in aqueous solution, while stirring. After 4 hours the yield of the secondary amine formed is 70% and after 8 hours the yield has increased to 81%. The latter yield is obtained with 20% ammonia excess already after 4 hours. When carrying out the conversion in previously employed mother lye the yield of the secondary amine is considerably increased which shows that the mother lye contains primary amine. The melting point of the ditrinitroethylamine obtained is 107° C. and its content of nitrogen 28.3% (theoretical value 28.58%). The remaining hydrogen in the NH group is replaceable and, e. g. may be substituted by $NO_2$ or other groups.

Example 2

2 mol. trinitroethanol are dissolved in the same quantity of methanol. In the solution the calculated quantity of gaseous ammonia is introduced at room temperature. Excess is to be avoided. On introduction the ammonia is warmed a little. As soon as half of the quantity of the ammonia has been supplied, crystal needles begin to separate. The separation increases with further reaction. On cooling after performed introduction of $NH_3$ the mass solidifies to a thick crystal grout. The product consists of ditrinitroethylamine. The yield is 90% of the theoretical value.

Example 3

2 mol. trinitroethanol are reacted at 80° C. for 2 hours with 1 mol. urea, while stirring, whereby symmetric ditrinitrcethylurea and certain other products are formed. The total quantity of the reaction product obtained is 80–82%, symmetric ditrinitroethylurea being an essential component thereof. Melting point 191° C. The content of nitrogen in the raw product is 29–30% (theoretical value for said substance, 29.0%).

Example 4

1 mol. ethylendiamine is reacted in aqueous solution at room temperature with 2 mol. trinitroethanol. A yellow precipitate is obtained in a yield of about 75–80%. The compound consists of ditrinitroethylethylendiamine, melting point 97.0° C. The nitrogen content was 28.0% (theoretical value 29.0%). Also in this case the hydrogen attached to the nitrogen is movable and may be substituted by e. g. $NO_2$.

Example 5

2 mol. trinitroethanol are reacted with 1 mol. hydrazinhydrate in aqueous solution. A yellow solid substance is obtained at room temperature. It is filtered off after cooling and dried. The nitrogen content of the substance is 32.4% (theoretical value 31.3%).

Example 6

178 g. e. g. 1 mol. potassium dinitroethanol was dissolved in 1500 ml. water and to the solution thus obtained 1 mol. concentrated $NH_3$ in aqueous solution was added at room temperature. The mixture was left to stand for 96 hours at room temperature, whereupon the water was removed in vacuum at low temperature (below 25° C.). Hereby a solid remainder was obtained having a nitrogen content of 20.2%. Tertiary potassiumdinitroethanolamine has theoretically 20.2%. The yield was quantitative.

Example 7

To 2 g. potassium dinitroethanol (1 mol.) dissolved in 600 ml. water, 3 mol. concentrated ammonia in aqueous solution was added. The mixture was heated 1 hour on water bath and then cooled, whereupon the water was removed in vacuum in the same manner as in the previous example. The remainder obtained was a yellow powder with 28.8% nitrogen, the theoretical nitrogen content of potassium dinitroethanolmonoamine being 24.1%. Also in this case the yield was quantitative.

Example 8

166 g. (e. g. 1 mol.) dinitropropandiol (theoretical content of nitrogen 16.9) was dissolved in about 1200 ml. water, whereupon 1 mol. concentrated ammonia in aqueous solution was added thereto. The solution was left to stand over night at room temperature. When the ammonia was added, at first a viscous oil was obtained which over night was converted to a light yellow powder. The product had a nitrogen content of 29.6% as compared with the theoretical value 28.7% for propandinitroimine

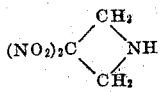

We claim:

1. The process which comprises reacting, in the presence of an inert solvent, a polynitroalcohol, having at least two nitro groups attached to one carbon atom and a primary hydroxyl group attached to a second carbon atom adjacent to the aforesaid carbon atom, with a nitrogen compound containing the group $NH_2$— and selected from the class consisting of ammonia, primary amines, carboxylic acid amides and hydrazine, and recovering the resulting polynitroamine compound.

2. The process of claim 1 wherein said nitrogen compound is $NH_3$.

3. The process of claim 1 wherein said nitrogen compound is a primary amine.

4. The process of claim 1 wherein said nitrogen compound is a carboxylic acid amide.

5. The process of claim 4 wherein said amide is urea.

6. The process of claim 1 wherein the nitrogen compound is hydrazine.

7. The process of claim 1 wherein the inert solvent is water.

8. The process of claim 1 wherein the inert solvent is methanol.

9. The process which comprises reacting a polynitroethanol with ammonia in the presence of an inert solvent and recovering the polynitroethylamine thereby produced.

10. The process which comprises reacting, in the presence of an inert solvent, trinitroethanol with a nitrogen compound containing the group $NH_2$—, and recovering the resulting trinitroamine.

11. The process of claim 1 wherein the said polynitroalcohol is dinitroethanol.

12. The process of claim 1 wherein the said polynitroalcohol is dinitropropandiol.

References Cited in the file of this patent

UNITED STATES PATENTS

| Number | Name | Date |
|---|---|---|
| 2,042,621 | Olen | June 2, 1936 |
| 2,186,464 | Mauersberger | Jan. 9, 1940 |
| 2,349,222 | Goshorn | May 16, 1944 |
| 2,408,171 | Johnson | Sept. 24, 1946 |
| 2,416,046 | Dittmar et al. | Feb. 18, 1947 |
| 2,419,506 | Senkus | Apr. 22, 1947 |
| 2,421,165 | Senkus | May 27, 1947 |

OTHER REFERENCES

Benayr: Chem. Abst., vol. 25, pp. 125–4 (1931).